(12) United States Patent
Stewart et al.

(10) Patent No.: US 7,173,528 B1
(45) Date of Patent: Feb. 6, 2007

(54) SYSTEM AND METHOD FOR DISABLING DATA ON RADIO FREQUENCY IDENTIFICATION TAGS

(75) Inventors: Roger G. Stewart, Morgan Hill, CA (US); John Rolin, Morgan Hill, CA (US); Curtis Carrender, Morgan Hill, CA (US)

(73) Assignee: Alien Technology Corporation, Morgan Hill, CA (US)

(*) Notice: Subject to any disclaimer, the term of this patent is extended or adjusted under 35 U.S.C. 154(b) by 51 days.

(21) Appl. No.: 11/029,445

(22) Filed: Jan. 4, 2005

Related U.S. Application Data

(63) Continuation of application No. 10/141,489, filed on May 7, 2002, now Pat. No. 6,933,848.

(60) Provisional application No. 60/294,952, filed on May 31, 2001.

(51) Int. Cl.
*H04Q 5/22* (2006.01)
*H04M 11/04* (2006.01)
*G08B 11/21* (2006.01)

(52) U.S. Cl. .............. 340/572.3; 340/10.1; 340/10.51; 340/58.1

(58) Field of Classification Search .......... 340/572.3, 340/10.1, 10.51, 58.1, 10.4, 10.41, 568.1, 340/572.1
See application file for complete search history.

(56) References Cited

U.S. PATENT DOCUMENTS

| | | |
|---|---|---|
| 4,914,735 A | 4/1990 | Ichiyoshi ................ 342/125 |
| 5,151,684 A | 9/1992 | Johnsen ................... 340/572 |
| 5,448,847 A | 9/1995 | Teetzel ..................... 42/70.11 |
| 5,528,221 A | 6/1996 | Jeuch et al. .............. 340/572 |
| 5,874,902 A | 2/1999 | Heinrich et al. ......... 340/825.54 |
| 6,025,780 A | 2/2000 | Bowers et al. ........... 340/572.3 |
| 6,130,602 A | 10/2000 | O'Toole et al. .......... 340/10.33 |
| 6,147,605 A | 11/2000 | Vega et al. ............... 340/572.7 |
| 6,169,483 B1 | 1/2001 | Ghaffari et al. .......... 340/572.3 |
| 6,181,248 B1 | 1/2001 | Fockens ................... 340/572.3 |
| 6,189,789 B1 | 2/2001 | Levine et al. ............ 235/383 |
| 6,317,028 B1 | 11/2001 | Valiulis ................... 340/10.1 |
| 6,412,207 B1 | 7/2002 | Crye et al. ............... 42/70.06 |
| 6,501,390 B1 | 12/2002 | Chainer et al. .......... 340/870.16 |
| 6,598,791 B2 | 7/2003 | Bellis, Jr. et al. ........ 235/383 |
| 6,681,989 B2 | 1/2004 | Bodin ...................... 235/383 |
| 6,942,155 B1 | 9/2005 | Stewart et al. ........... 235/487 |
| 2002/0149468 A1 | 10/2002 | Carrender et al. ....... 340/5.61 |

*Primary Examiner*—Jeffery Hofsass
*Assistant Examiner*—Kimberly Jenkins
(74) *Attorney, Agent, or Firm*—Zilka-Kotab, PC

(57) ABSTRACT

The disclosed embodiments of the present invention are used to permanently disable or destruct an RFID so that it is no longer possible to read some or all of the data encoded on the RFID tag. In one method for disabling data on a radio frequency identification (RFID) tag, an RFID tag is identified and its identity is confirmed. Verification that a prerequisite event has occurred is obtained, occurrence of which is required prior to disablement of the data. A destruct instruction is transmitted to the RFID tag. The RFID tag verifies that the destruct instruction is valid and disables the data upon verifying validity of the destruct instruction. The tag may disable the data by erasing the data, disabling the data, auto-destructing, or performing any operation that makes the data unreadable.

80 Claims, 2 Drawing Sheets

SYSTEM AND METHOD FOR DISABLING DATA ON RADIO FREQUENCY IDENTIFICATION TAGS

RELATED APPLICATIONS

This application is a continuation of U.S. patent application Ser. No. 10/141,489 filed May 7, 2002 now U.S. Pat. No. 6,933,848. This application also claims priority from U.S. Provisional Patent Application entitled "RFID Privacy Protection," filed on May 31, 2001 under Ser. No. 60/294,952, and which is herein incorporated by reference in its entirety.

FIELD OF THE INVENTION

The present invention relates to radio frequency identification (RFID), and more particularly, this invention relates to disabling/destroying data on RFID tags.

BACKGROUND OF THE INVENTION

Radio frequency identification (RFID) is a technology that incorporates the use of electromagnetic or electrostatic coupling in the radio frequency (RF) portion of the electromagnetic spectrum to uniquely identify an object, animal, or person. RFID is coming into increasing use in industry as an alternative to the bar code. The advantage of RFID is that it does not require direct contact or line-of-sight scanning. RFID is sometimes also called dedicated short range communication (DSRC).

In an RFID system, multiple wireless tags are interrogated by sending information from an interrogating transmitter to the tags and having information transmitted by the tag in response. This is commonly accomplished by having the tag listen for an interrogation and for it to respond with a unique serial number and/or other information. However, it is desirable to extend the range of wireless tags so that it is not necessary to bring each tag close to a reader for reading. Two problems are evident when extending the range of the reading system. One of the problems is that there is limited power available for transmission from the wireless tag, and that if the range is significant, it is possible that many tags will be within range of the interrogating system and their replies may corrupt each other.

There are a number of methods and apparatuses that address these problems and enable the fabrication of wireless tags with longer ranges and an ability of the system to handle many tags in the sensitive range.

In one application, RFID tags can be used to identify items for purchase, inventory, etc. And, as outlined, there are known methods that enable one specific tag in a group of many tags to be interrogated without corruption by other tags of information sent by that one particular tag to the reader and without accidental transmission of data or commands to other tags of information sent to that particular tag.

The least expensive tags usually have read only memory. This is adequate for identifying a tag and for executing a purchase. However, at times, the purchaser might require privacy after the purchase so that another party cannot perform a scan and learn the contents of that purchaser's purse, car or home. Further, the tags may need to be disabled to allow the product to be taken through a security device that recognizes intact tags.

Thus, there are times when it is desirable to disable or destroy an RFID tag after purchase. This disablement may be either partial or complete and may be accomplished by data erasure, modification, etc. However, tags with destructible memory may be susceptible to thievery, in that a thief with the proper equipment could potentially disable a tag. Thus, it is desirable to require some type of validation of authority to disable a tag. Furthermore, when a tag is destroyed it is desirable that other tags within range of the disabling device, typically a reader, are not also destroyed.

DISCLOSURE OF THE INVENTION

The disclosed embodiments of the present invention are used to permanently disable or destruct a radio frequency identification (RFID) so that it is no longer possible to read some or all of the data encoded on the RFID tag. In one method for disabling data on a radio frequency identification RFID tag, an RFID tag is identified and its identity is confirmed. Verification that a prerequisite event has occurred is obtained, occurrence of which is required prior to disablement of the data. For example, the data of the RFID tag may be associated with an item, where the prerequisite event is a purchase of the item. A destruct instruction is transmitted to the RFID tag. The RFID tag verifies that the destruct instruction is valid and disables the data upon verifying validity of the destruct instruction. The tag may disable its data by erasing the data, locking tag data, destroying only a portion of the data, auto-destructing (physical destruction of the device), or performing any operation that makes the data unreadable or unavailable. The tag may also be disabled so that the data can be resurrected upon application of a proper code or other means of authorization.

In one embodiment, the authorization of a user to order disabling of the data is verified prior to disablement of the data. In another embodiment, receipt of a request for disablement is received prior to disabling the data. Thus, the request for disablement may be required prior to transmission of the destruct instruction to the RFID tag. A request for disablement can be automatically generated upon occurrence of the prerequisite event, such as when an item is a final sale.

In an embodiment, transmission of further destruct commands is disabled for a predetermined period of time after an unsuccessful attempt to disable the data. In a further embodiment, the destruct instruction includes a unique destruct code.

A radio frequency identification (RFID) system according to one embodiment includes an RFID tag having data stored thereon. The RFID tag is capable of disabling the data upon receipt of a destruct instruction. Communication logic, such as a transceiver, communicates with the RFID tag via an antenna. In particular, the communication logic transmits a destruct instruction to the RFID tag. Identification logic identifies the RFID tag, and confirmation logic confirms an identity of the RFID tag.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
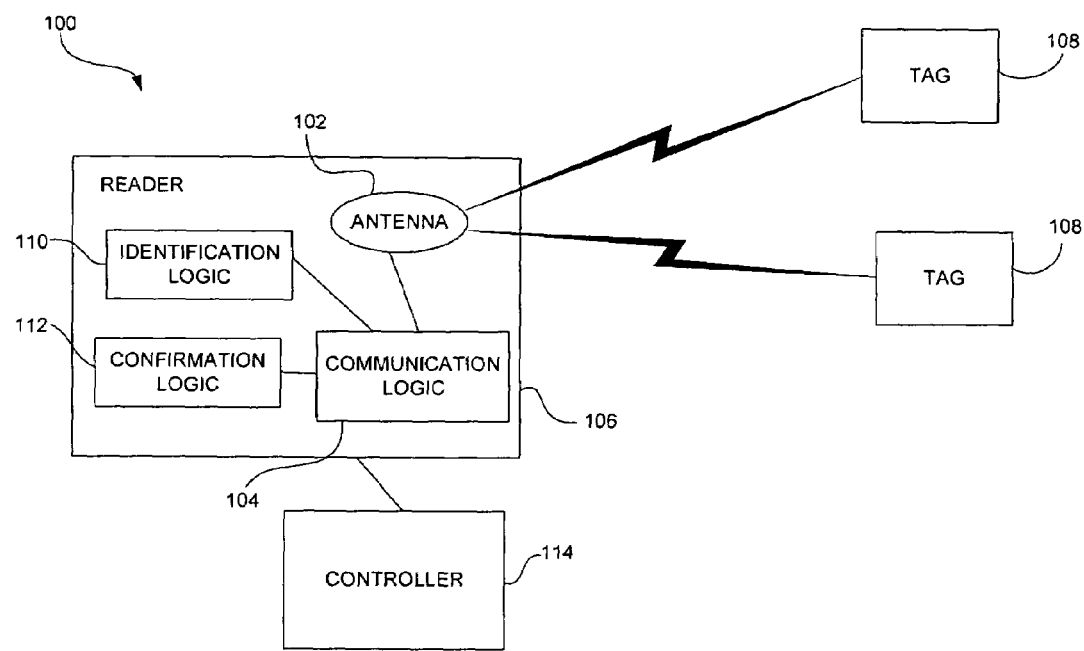
FIG. 1 depicts an RFID system according to one embodiment.

FIG. 1 depicts an RFID system 100 according to one embodiment. As shown, the system includes three components: an antenna 102 and transceiver 104 (here combined into one reader 106) and one or more transponders 108 (the tags). The transceiver is a combination transmitter/receiver in a single package. The system may also include identification logic 110 for identifying the RFID tag and confirmation logic 112 for confirming an identity of the RFID tag.

The antenna uses radio frequency waves to transmit a signal that activates a tag. When activated, the tag transmits data back to the antenna. The data is used to notify a programmable logic controller 114 that an action should occur. The action could be as simple as raising an access gate or as complicated as interfacing with a database to carry out a monetary transaction. High and low-frequency systems may be used in any of the embodiments described herein. Illustrative low-frequency RFID systems (30 KHz to 16 MHz) have short transmission ranges (generally less than six feet). Illustrative high-frequency RFID systems (850 MHz to 950 MHz and 2.4 GHz to 2.5 GHz) can offer longer transmission ranges (more than 90 feet).

The disclosed embodiments of the present invention are used to permanently disable or destruct an RFID so that it is no longer possible to read some or all of the data encoded on the tag. More particularly, the methodology according to a preferred embodiment includes a unique series of steps to permanently disable or destroy data on the RFID tag. It should be noted that in this description the words disable, destruct, kill, and destroy may be used interchangeably and are used to indicate that data encoded on the tag can no longer be read and not necessarily to indicate the physical destruction of the tag.

Figure 2:
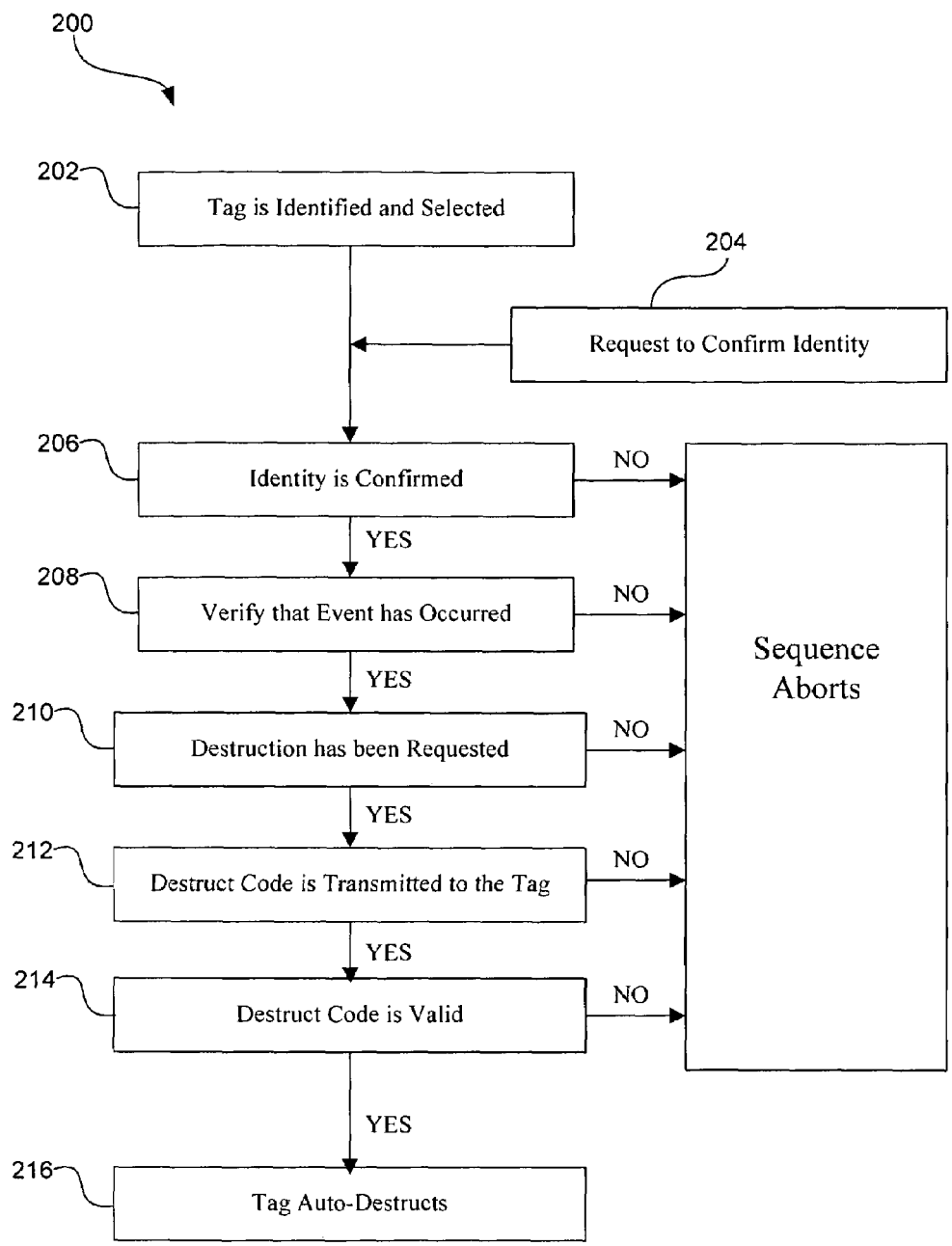
FIG. 2 is a flow diagram of a destruct sequence and related operations according to a preferred embodiment.

FIG. 2 is a flow diagram of a destruct sequence 200 and related operations according to a preferred embodiment. The destruct sequence is performed on a selected tag.

In operation 202, the tag to be disabled is identified and selected. The selected tag may be sufficiently close to the reader or previously known to be unique so that no specific procedure need be undertaken to select the tag. Alternatively, the tag may be one of many tags within range of the reader. In this case an anti-collision procedure may need to be performed to select the tag, that is, to prevent information from and to the tag from being corrupted by other tags. As will be apparent to one skilled in the art, there are a number of known methods of performing anti-collision to select one specific RF tag from many RF tags responding to a given reader signal.

Preferably, each tag contains a unique binary identification code unlike that of any other tag. When reset, all tags respond to any query from the reader. The reader need discriminate only between two conditions: either "no response" or "one or more responses".

The reader starts with the query "are there any tags within range?". If there are, the reader then begins loading code bits into the tags one bit or more at a time. As the tag bit registers begin to fill up, the tags become progressively more discriminating about responding to the reader.

For example, three 2-bit commands may be used to control a search of all tags. Such a search is efficient and is linearly proportional to the number of tags times the length of the code.

Once the tag is selected the destruct sequence begins. The destruct sequence leads to the permanent destruction of the tag provided that the circuitry of the tag is designed to destroy the tag when the appropriate sequencing conditions are met.

Once the tag is selected and its identity is believed to be known, a destruct sequence is performed. The destruct sequence comprises a series of steps in the following sequence: an ID CONFIRMATION, a PURCHASE, DESTRUCT CODE TRANSMISSION and VERIFICATION AND DESTRUCTION. Furthermore, a REQUEST FOR DESTRUCTION must occur somewhere during the sequence.

It is important to emphasize that there can be different levels of security. Someone taking inventory may be able to access certain tag information, but will not be allowed to disable or destroy the tag. For example, the person taking inventory may have access to a CONFIRM CODE to verify a tag's identity but not to other steps in a disable or destroy sequence or may have access to a Confirm Code to start a destruct sequence but not to a second special Destruct Code required to complete a destruct sequence. Other personnel, for example a checkout person might have access to all the necessary means to initiate a destruct sequence to destruct a tag.

In operation 204, a request to confirm the identity of the tag is received. The identity of the tag is confirmed in operation 206, such as by using a CONFIRM CODE. An example of the use of a CONFIRM CODE is that at the end of a search, a reader calculates an 8-bit CRC (sufficient to enable the tag to detect multiple bit errors) and sends the CRC to the tag. The tag compares the CRC with a pre-calculated 8-bit code and mutes if there is no match. If the codes match on the tag, the tag will send another stored 8-bit code back to the reader. If the identity of the tag cannot be confirmed, the sequence aborts.

The second step is the PURCHASE. Once a purchase is made, the ability to download a disable or destruct code is permitted. That is, the purchase of the item makes it possible to download the code required to destroy a tag. The DESTRUCT CODE can be, for example a unique 8 bit code.

It is noted that in certain circumstances either the purchaser or the seller may choose to not destroy the tag. Thus, even if a purchase has been made, a request for destruction must be present in order to send the DESTRUCT CODE to the tag. It should also be noted that under other circumstances, for example when an item is a final sale and cannot be returned, a purchase triggers an automatic request for destruction.

The third step is DESTRUCT CODE TRANSMISSION. In the DESTRUCT CODE TRANSMISSION step, provided that a REQUEST FOR DESTRUCTION has been made during the sequence, the destruct code is downloaded and transmitted to the tag.

The fourth step is DISABLEMENT or DESTRUCT. The tag confirms that the destruct code is valid and destroys the tag.

In a preferred embodiment, the destruct sequence of commands comprises an identity match; followed by a correct response; followed by a purchase. The cash register reader then may (or may not) provide a unique 8-bit DESTRUCT Code, after which the tag configures itself for destruction, verifies that the DESTRUCT CODE is valid, and is subsequently destroyed by having the tag within a range of, for example, 10 cm from the reader. Receipt of further destruct commands is automatically disabled for 5 seconds or more after any unsuccessful destruct attempt.

It is important to emphasize that there can be different levels of security. Someone taking inventory may be able to access certain tag information, but will not be allowed to disable or destroy the tag. For example, the person taking inventory may have access to a confirm code to verify a tag's identity but not to other steps in a disable or destroy sequence or may have access to a confirm code to start a destruct sequence but not to a second special destruct code required to complete a destruct sequence. Other personnel, for example a checkout person, might have access to all the necessary means to initiate a destruct sequence to destruct a tag.

Occurrence of the prerequisite event may be required as a requisite to completing the sequence. In operation 208, a verification that a prerequisite event has occurred is received or retrieved from an internal or external source. If the event has not occurred, or cannot be verified, the sequence is paused, aborted, or retried after a period of time. One example of a prerequisite event is purchase of an item.

In operation 210, a request for destruction is received. Note that the request for destruction may be received anywhere in the sequence.

Continuing with the purchase example, in certain circumstances either the purchaser or the seller may choose to not destroy the tag. In such circumstances, even if a purchase has been made, a request for destruction may be required in order to send the destruct code to the tag. If the request has not been received, the sequence may be aborted. It should also be noted that under other circumstances, for example when an item is a final sale and cannot be returned, a purchase triggers an automatic request for destruction.

In operation 212, a destruct code is retrieved, such as from a remote or local computer or the reader itself, and transmitted to the tag. Transmission of the destruct instruction may be contingent on receipt of a request for destruction during the sequence.

The destruct instruction can be or include, for example, a unique 8 bit code, that may be unique to each particular tag. Preferably, the destruct code is not algorithmically calculated, but is a random code that can be created by the manufacturer of the item.

Preferably, the tag uses persistent data storage to defeat attempts to break the code. If a user attempts to destroy the data with an unauthorized code, the tag can remember that event and not allow disabling for a period of time even without power. So someone trying to run through all possible codes might have to try for hours or days before finding the right code.

In operation 214, the tag confirms that the destruct code is valid, and in operation 216 destroys/disables/destructs/locks some or all of the data in the tag.

In the context of a purchase example, once a purchase is made, a record of the purchase is created and made accessible. The purchase may be a prerequisite event to disabling the tag. When a request to destroy the tag is received, the record of the purchase is retrieved. The ability to download a disable or destruct code is permitted if the record is found. That is, the purchase of the item makes it possible to download the code required to destroy a tag from a database to the reader. If the item is not purchased, the destruct code is not transmitted to the tag. Further, the destruct code may be accessible only through the cashier's machine.

In a preferred embodiment for commerce, the destruct sequence of commands comprises an identity match; followed by a correct response; followed by a purchase. The cash register reader then may (or may not) provide a unique 8-bit destruct code (destruct instruction), after which the tag configures itself for destruction, verifies that the destruct code is valid, and is subsequently destroyed by having the tag within a range of, for example, 10 cm from the reader, which acts as the disabling device. Receipt of further destruct commands is automatically disabled for a period of time, such as 5 seconds or more, after any unsuccessful destruct attempt. This lock-out period may be triggered by an unsuccessful destruct attempt or by a loss of power following such unsuccessful attempt.

While various embodiments have been described above, it should be understood that they have been presented by way of example only, and not limitation. Although disablement has been primarily described herein at point of purchase, it would be obvious to one skilled in the art that such disablement may be done at other times in the life cycle of the tag. Thus, the breadth and scope of a preferred embodiment should not be limited by any of the above-described exemplary embodiments, but should be defined only in accordance with the following claims and their equivalents.

What is claimed is:

1. A method for disabling at least a portion of a radio frequency identification (REID) tag, comprising:
   activating an RFID tag having data thereon using radio frequency waves, wherein the RFID tag, being powered by the radio frequency waves, transmits data via backscatter modulation when activated;
   identifying the RFID tag;
   confirming an identity of the RFID tag;
   verifying that a prerequisite event has occurred, occurrence of the prerequisite event being required prior to disablement of the data; and
   transmitting a destruct instruction to the RFID tag, wherein the RFID tag verifies that the destruct instruction is valid, whereupon at least a portion of the RFID tag is disabled.

2. The method of claim 1, further comprising taking the RFID tag through a security device, the security device recognizing intact tags.

3. The method of claim 1, further comprising verifying authorization of a user to order disabling of the data.

4. The method of claim 1, wherein the data of the RFID tag is associated with an item, wherein the prerequisite event is a purchase of the item.

5. The method of claim 1, further comprising requiring receipt of a request for disablement prior to disabling the data.

6. The method of claim 5, wherein a request for disablement is automatically generated upon occurrence of the prerequisite event.

7. The method of claim 1, further comprising disabling transmission of further destruct commands for a predetermined period of time after an unsuccessful attempt to disable the data.

8. The method of claim 1, wherein the destruct instruction includes a unique destruct code.

9. The method of claim 1, wherein disablement of the portion of the RFID tag includes disabling an identification code unique to the RFID tag.

10. A system for disabling data on a radio frequency identification (RFID) tag, comprising:
   logic for activating an RFID tag having data thereon using radio frequency waves, wherein the RFID tag, being powered by the radio frequency waves, transmits data via backscatter modulation when activated;

logic for identifying the RFID tag;

logic for confirming an identity of the RFID tag;

logic for verifying that a prerequisite event has occurred, occurrence of the prerequisite event being required prior to disablement of the data; and logic for transmitting a destruct instruction to the RFID tag, wherein the RFID tag verifies that the destruct instruction is valid, whereupon at least a portion of the RFID tag is disabled.

11. A computer program product in a computer readable medium for disabling data on a radio frequency identification (RFID) tag, comprising:

computer code for activating an RFID tag having data thereon using radio frequency waves, wherein the RFID tag, being powered by the radio frequency waves, transmits data via backscatter modulation when activated;

computer code for identifying the RFID tag;

computer code for confirming an identity of the RFID tag;

computer code for verifying that a prerequisite event has occurred, occurrence of the prerequisite event being required prior to disablement of the data; and computer code for transmitting a destruct instruction to the RFID tag, wherein the RFID tag verifies that the destruct instruction is valid, whereupon at least a portion of the REID tag is disabled.

12. A method for disabling at least a portion of a radio frequency identification (RFID) tag, comprising:

transmitting identification information from an RFID tag via backscatter modulation, wherein the identity of the RFID tag is confirmed;

receiving a destruct instruction;

verifying that the destruct instruction is valid; and disabling at least a portion of the tag if the destruct instruction is valid.

13. The method of claim 12, wherein the portion of the RFID tag is associated with an item.

14. The method of claim 12, wherein the disablement includes locking the portion of the tag.

15. The method of claim 12, wherein the disablement includes destroying the portion of the tag.

16. The method of claim 12, wherein the disablement includes disabling an identification code unique to the RFID tag.

17. The method of claim 12, further comprising requiring receipt of a request for disablement prior to disabling the data.

18. The method of claim 12, further comprising receiving verification that a prerequisite event has occurred, occurrence of the prerequisite event being required prior to execution of the destruct instruction by the RFID tag.

19. The method of claim 12, further comprising disabling receipt of further destruct commands for a predetermined period of time after an unsuccessful attempt to disable the data.

20. The method of claim 12, wherein the destruct instruction includes a unique destruct code.

21. A radio frequency identification (REID) tag, comprising:

a circuit for transmitting identification information from an RFID tag via backscatter modulation, wherein the identity of the RFID tag is confirmed;

a circuit for receiving a destruct instruction;

a circuit for verifying that the destruct instruction is valid; and a circuit for disabling at least a portion of the tag if the destruct instruction is valid.

22. A radio frequency identification (RFID) system, comprising:

an RFID tag having data stored thereon and being powered by radio frequency waves, the RFID tag disabling at least a portion of the data upon receipt of a destruct instruction;

a communication circuit for communicating with the RFID tag, a transceiver transmitting a destruct instruction to the RFID tag;

an identification circuit coupled to the communication circuit for identifying the RFID tag; and a confirmation circuit coupled to the communication circuit for confirming an identity of the RFID tag.

23. The system of claim 22, wherein the RFID tag responds to the communication circuit via backscatter modulation.

24. The system of claim 22, wherein the RFID tag verifies that the destruct instruction is valid.

25. The system of claim 22, wherein occurrence of a prerequisite event is required prior to transmission of the destruct instruction to the RFID tag.

26. The system of claim 25, wherein the data of the RFID tag is associated with an item, wherein the prerequisite event is a purchase of the item.

27. The system of claim 22, wherein an authorization of a user to order disabling of the data is verified.

28. The system of claim 22, wherein receipt of a request for disablement is required prior to disabling the data.

29. The system of claim 28, wherein a request for disablement is automatically generated upon occurrence of a prerequisite event.

30. The system of claim 22, wherein receipt of further destruct commands is disabled for a predetermined period of time after an unsuccessful attempt to disable the data.

31. The system of claim 22, wherein disablement of the data of the RFID tag includes disabling an identification code unique to the RFID tag.

32. The method of claim 1, further comprising resurrecting the disabled portion upon application of a proper code.

33. The method of claim 1, wherein the disabled portion is permanently disabled.

34. The method of claim 1, wherein the transmitting is performed by a transceiver coupled to an antenna.

35. The system of claim 10, further comprising logic for resurrecting the disabled portion upon application of a proper code.

36. The system of claim 10, wherein the disabled portion is permanently disabled.

37. The system of claim 10, further comprising a transceiver coupled to an antenna.

38. The method of claim 12, further comprising taking the RID tag through a security device, the security device recognizing intact tags.

39. A method for operating a reader to disable an RFID tag, the method comprising:

calculating a CRC to confirm identity of the tag, the CRC having a bit length sufficient to detect a bit error;

transmitting the CRC to the tag;

after the transmitting, receiving by the reader a code having the bit length; and transmitting a destruct code to the tag to disable at least a portion of the tag, the destruct code being calculated and unique to the tag.

40. The method of claim 39, wherein the destruct code is algorithmically calculated.

41. The method of claim 39, wherein the transmitting of the destruct code occurs at a point of purchase.

42. The method of claim 39, wherein the bit length is sufficient to detect multiple bit errors.

43. The method of claim 39, wherein the transmitting is performed by a transceiver coupled to an antenna.

44. The method of claim 39, wherein the transmitting ranges from 850 MHz to 950 MHz.

45. The method of claim 39, wherein the bit length is 8 bits.

46. The method of claim 39, wherein the tag is within 10 cm of the reader.

47. The method of claim 39, further comprising retrieving the destruct code by the reader from a computer.

48. The method of claim 39, further comprising accessing a cashier's machine by the reader.

49. An RFID reader comprising:
logic to calculate a CRC to confirm identity of a tag, the CRC having a bit length sufficient to detect multiple bit errors;
logic to transmit the CRC to the tag;
logic to receive a code having the bit length;
logic to transmit a destruct code to the tag to disable at least a portion of the tag, the destruct code being calculated and unique to the tag.

50. The reader of claim 49, further comprising:
an antenna; and
a transceiver coupled to the antenna.

51. The reader of claim 49, wherein transmissions from the RFID reader ranges from 850 MHz to 950 MHz.

52. The reader of claim 49, wherein transmissions from the RFID reader ranges from 30 KHz to 16 MHz.

53. The reader of claim 49, wherein transmissions from the RFID reader ranges from 2.4 GHz to 2.5 GHz.

54. The reader of claim 49, further comprising logic to access a cashier's machine.

55. A method for disabling an RFID tag, the method comprising:
calculating a CRC to confirm identity of a tag, the CRC having a bit length sufficient to detect multiple bit errors;
transmitting the CRC to the tag to allow comparison of the CRC with a first code;
if the CRC matches the first code, receiving a second code having the bit length; and
transmitting a destruct code to the tag to disable at least a portion of the tag, the destruct code being calculated and unique to the tag.

56. The method of claim 55, wherein the transmitting of the destruct code occurs at a point of purchase.

57. The method of claim 55, wherein the transmitting the destruct code is performed by a transceiver coupled to an antenna.

58. The method of claim 55, wherein a frequency of transmitting the destruct code ranges from 850 MHz to 950 MHz.

59. The method of claim 55, further comprising accessing a cashier's machine.

60. An RFID system, comprising:
a reader performing the method of claim 1; and
a plurality of RFID tags in communication with the reader.

61. An RFID system, comprising:
a reader; and
a plurality of RFID tags in communication with the reader, at least one of the RFID tags performing the method of claim 12.

62. An REID system, comprising:
a reader performing the method of claim 39; and
a plurality of RFID tags in communication with the reader.

63. An RFID system, comprising:
a reader performing the method of claim 55; and
a plurality of RFID tags in communication with the reader.

64. A method for disabling at least a portion of a radio frequency identification tag, comprising:
transmitting by only one antenna a kill instruction to the tag;
verifying by the tag that the kill instruction is valid; and
disabling at least a portion of the tag if the kill instruction is valid.

65. The method of claim 64 wherein the only one antenna is coupled to a transceiver.

66. The method of claim 64 wherein the tag is within 10 centimeters of a disabling device during the transmitting, the disabling device comprising the only one antenna.

67. The method of claim 64 wherein the kill instruction is algorithmically calculated.

68. The method of claim 64 wherein the kill instruction comprises a random code.

69. The method of claim 64 wherein the disabled portion is permanently disabled.

70. The method of claim 64 further comprising taking the RFID tag through a security device, the security device recognizing intact tags.

71. A method for disabling at least a portion of a radio frequency identification (RFID) tag, comprising:
performing an anti-collision procedure to select a tag from a plurality of RFID tags;
after the performing, transmitting a kill instruction to the selected tag;
verifying by the selected tag that the kill instruction is valid; and
disabling at least a portion of the tag if the kill instruction is valid.

72. The method of claim 71 wherein the kill instruction is algorithmically calculated.

73. The method of claim 71 wherein the transmitting is by only one antenna.

74. The method of claim 73 wherein the selected tag is within 10 centimeters of a reader during the transmitting, the reader comprising the only one antenna.

75. A method for disabling at least a portion of a radio frequency identification tag, comprising:
transmitting, by a disabling device having only one antenna, a kill instruction to the tag;
verifying by the tag that the kill instruction is valid; and
disabling at least a portion of the tag if the kill instruction is valid.

76. The method of claim 75 wherein the kill instruction is algorithmically calculated.

77. The method of claim 75 wherein the transmitting is after an occurrence of a prerequisite event, the prerequisite event being received by the disabling device from an external source.

78. A method for disabling at least a portion of a radio frequency identification tag, comprising:

transmitting, by a reader, a kill instruction to the tag after an occurrence of a prerequisite event;

verifying by the tag that the kill instruction is valid; and disabling at least a portion of the tag if the kill instruction is valid.

79. The method of claim 78 wherein the kill instruction is calculated at least by one of algorithmically and randomly.

80. The method of claim 78 wherein the prerequisite event is received by the reader from an external source.

* * * * *

UNITED STATES PATENT AND TRADEMARK OFFICE
CERTIFICATE OF CORRECTION

| | | |
|---|---|---|
| PATENT NO. | : 7,173,528 B1 | Page 1 of 1 |
| APPLICATION NO. | : 11/029445 | |
| DATED | : February 6, 2007 | |
| INVENTOR(S) | : Stewart et al. | |

It is certified that error appears in the above-identified patent and that said Letters Patent is hereby corrected as shown below:

Col. 6, line 27 change "REID" to --RFID--;
Col. 7, line 28 change "REID" to --RFID--;
Col. 7, line 32 change "the identity" to --an identity--;
Col. 7, line 60 change "REID" to --RFID--;
Col. 7, lines 63-64 change "the identity" to --an identity--;
Col. 8, line 54 change "RID" to --RFID--;
Col. 10, line 1 change "REID" to --RFID--;

Signed and Sealed this

Twenty-second Day of May, 2007

JON W. DUDAS
*Director of the United States Patent and Trademark Office*